United States Patent [19]

Williams

[11] 4,271,477

[45] Jun. 2, 1981

[54] DETERMINING THE DIMENSIONS OF WORKPIECES

[75] Inventor: Gerald B. Williams, Port Talbot, Wales

[73] Assignee: British Steel Corporation, London, England

[21] Appl. No.: 41,072

[22] Filed: May 21, 1979

[30] Foreign Application Priority Data

May 17, 1978 [GB] United Kingdom ............... 20200/78

[51] Int. Cl.³ ............................................. G01B 11/04
[52] U.S. Cl. ..................................... 364/563; 364/560; 250/560; 356/381; 356/386; 356/390
[58] Field of Search ................ 364/560, 563; 250/559, 250/560, 571, 578, 224; 356/381, 384, 385, 386–388, 390

[56] References Cited

U.S. PATENT DOCUMENTS

| | | | |
|---|---|---|---|
| 3,565,531 | 2/1971 | Kane et al. | 356/381 |
| 3,671,726 | 6/1972 | Kerr | 356/381 |
| 3,732,016 | 5/1973 | Deshayes et al. | 250/560 |
| 3,802,774 | 4/1974 | Eschler et al. | 250/560 |
| 3,997,270 | 12/1976 | Suzuki | 356/385 |
| 4,033,697 | 7/1977 | Pfoutz et al. | 250/560 |
| 4,063,820 | 12/1977 | Borgese | 356/381 |
| 4,152,767 | 5/1979 | Laliotis | 364/560 |
| 4,160,599 | 7/1979 | Sperrazza | 250/560 |
| 4,173,788 | 11/1979 | Laliotis | 364/560 |

Primary Examiner—Charles E. Atkinson
Assistant Examiner—Gary Chin
Attorney, Agent, or Firm—Bacon & Thomas

[57] ABSTRACT

A method for measuring the width and/or the thickness of a workpiece comprising imaging a plane of the workpiece at two positions displaced vertically above a datum producing signals indicative of the angle subtended by the workpiece at the image positions and representative of the image widths apparent at these positions, combining the signals to provide product and difference components and calculating from the components the true workpiece width when at the datum and/or the workpiece thickness.

22 Claims, 3 Drawing Figures

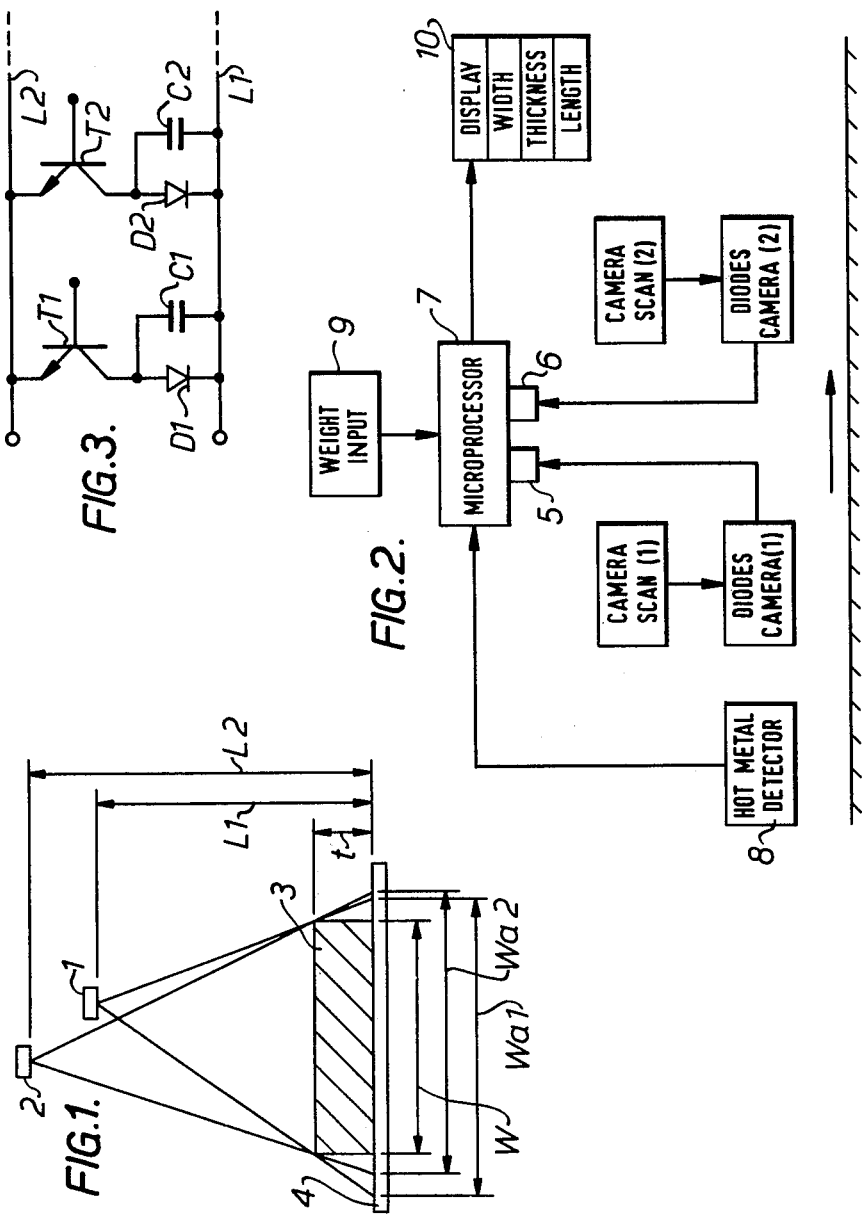

DETERMINING THE DIMENSIONS OF WORKPIECES

The present invention relates to the determination of the dimensions of workpieces and is particularly concerned with the measurement of the width of metal workpieces such as slab, bar, strip and the like and with the measurement of the thickness of relatively thick metal workpieces such as slab, bar and the like.

The accurate measurement of the width of metal slab, bar, strip, plate and the like during processing of this material has presented many problems to the manufacturer. The same problems also apply to the measurement of slab and bar thickness.

One conventional technique for measuring strip width involves the positioning of two TV cameras immediately above either edge of the strip, the cameras being separated by an accurately known distance. An accurate screw adjustment sets the nominal camera separation in increments of 1 mm. Each camera monitors a 100 mm wide portion over an edge of the material, the illumination being provided by a green flourescent tube mounted under the material. The cameras are focussed upon the surface upon which the strip is moving and deviations of each edge from its nominal position are monitored after the required screw adjustment has been carried out.

The accuracy of the system depends on the separation between the cameras at any time being known accurately and to build in such accuracy requires highly sophisticated and expensive engineering.

The nominal width of the material must be known in order for the actual width to be determined; in a hot strip mill, the width of the material changes infrequently, but in a slabbing mill the dimensions of the slab are frequently changed which would require constant resetting of the camera separation.

If the equipment were used for slab width measurement, then any lateral movement of the slab could seriously affect the accuracy of the equipment and would necessitate the use of edge guide control to constrain slabs within the measuring field of the instrument.

If the material has appreciable thickness e.g. slabs and bars, then the nominal width setting must be equal to or greater than the maximum width to be encountered, otherwise errors will be introduced into the measurement by the finite thickness of the material. In addition, if the width of the slab changes, the nominal width separation between the cameras must be accurately reset to avoid errors in measurement.

Even in its conventional mode, that is, the measurement of strip width, the equipment displays disadvantages where the strip flaps, that is, undulates through perhaps inconsistant rolling speed. In this case, errors in measurement arise if the strip moves out of the field of view of the cameras.

It is therefore an object of the present invention to provide a system in which the disadvantages inherent in the conventional width measurement systems are at least minimised and in which not only the width of a workpiece, but also its thickness, can be measured.

According therefore to one aspect of the present invention, a method for measuring the width and/or thickness of a moving workpiece, comprises imaging a plane of the workpiece at two positions displaced vertically above a datum producing signals indicative of the angle subtended by the workpiece at the image positions and representative of the image widths apparent at these positions, combining the signals to provide product and difference components and calculating from the components the true workpiece width when at the datum and/or the workpiece thickness.

The actual width W of the workpiece may be calculated from the equation $$W = \frac{W_{a_1} W_{a_2}(L_2 - L_1)}{W_{a_1} L_2 - W_{a_2} L_1}$$

where $W_{a_1}$ is the apparent width of the first image, $W_{a_2}$ is the apparent width of the second image, $L_1$ is the distance of the first image from the datum or surface upon which the workpiece is supported or moving and $L_2$ is the distance of the second image from the datum or surface upon which the workpiece is supported or moving.

The actual thickness t of the workpiece may be calculated from the equation $$t = \frac{L_1 L_2 (W_{a_1} - W_{a_2})}{W_{a_1} L_2 - W_{a_2} L_1}$$

where $W_{a_1}$ is the apparent width of the first image, $W_{a_2}$ is the apparent width of the second image, $L_1$ is the distance of the first image from the datum or surface upon which the workpiece is supported or moving and $L_2$ is the distance of the second image from the datum or surface upon which the workpiece is supported or moving.

Preferably the images are reproduced as linear arrays of electrical charges which are scanned for discharge so as to provide the electrical signals, the scanning is continuous to provide several values of $W_{a_1}$ and $W_{a_2}$ along the length of the moving workpiece so that $W_{a_1}$ and $W_{a_2}$ can be averaged to provide an average value of W and/or t. Conveniently the average values of W and t are used to determine a value of length to be cropped from the workpiece to produce a desired cropped weight.

Preferably the images are also displaced horizontally from each other.

Suitably the electrical signals are pulses of width analogous to that of the apparent image widths and conveniently the pulses are utilised to generate clock pulses which are counted and utilised to determine the apparent image widths.

Preferably, to provide an accurate measurement of t, the thickness t of the workpiece is at least one-tenth of the workpiece width W.

According to another aspect of the present invention, apparatus for measuring the width and/or thickness of a moving workpiece comprises a pair of imaging devices for location at two vertically and horizontally displaced positions above the workpiece to avoid obstruction of the upper image by the lower image, the devices being focussable to provide images of a width plane of the workpiece, means for producing electrical signals indicative of the angle subtended by the workpiece at the positions and representative of image widths apparent at these positions means for combining the signals to provide product and difference components, together with means for determining from the components the actual width and/or thickness of the workpiece.

The means for determining the actual width W of the workpiece may utilise the equation $$W = \frac{Wa_1 Wa_2(L_2 - L_1)}{Wa_1 L_2 - Wa_2 L_1}$$

where $Wa_1$ is the apparent width of the first image, $Wa_2$ is the apparent width of the second image, $L_1$ is the distance of the first image from the surface upon which the workpiece is supported or moving and $L_2$ is the distance of the second image from the surface upon which the workpiece is supported or moving.

The means for determining the thickness of the workpiece may utilise the equation $$t = \frac{L_1 L_2(Wa_1 - Wa_2)}{Wa_1 L_2 - Wa_2 L_1}$$

where $Wa_1$ is the apparent width of the first image, $Wa_2$ is the apparent width of the second image, $L_1$ is the distance of the first image from the surface upon which the workpiece is supported or moving and $L_2$ is the distance of the second image from the surface upon which the workpiece is supported or moving.

The imaging devices suitably comprise optical devices such as lenses.

Preferably the means for producing electrical signals comprises radiation sensitive sensors adapted to reproduce the images as linear arrays of electrical charges. Suitably the arrays are in the form of photodiodes responsive to both infra red radiation as well as visible light.

Conveniently scanning means are provided to discharge the diodes to produce pulses of widths representative of the apparent widths $Wa_1$ and $Wa_2$. The scanning means are preferably adapted to scan the images continuously to produce several values of $Wa_1$ and $Wa_2$ along the length of the workpiece whereby $Wa_1$ and $Wa_2$ can be averaged to provide an average value of $W$ and/or $t$. Suitably the means for determining the actual width and/or thickness of the workpiece is adapted to calculate the average values of $W$ and $t$ and thence to determine a value of the length to be cropped from the workpiece to produce a desired cropped weight.

Preferably the signal translation means comprises an oscillator responsive to the signals to generate pulses numerically analogous to the respective apparent widths, together with a counter for counting the pulses. The signal translation means and the means for determining the actual width and/or thickness may comprise a single unit, for instance, a microprocessor.

An embodiment of the invention will now be particularly described by way of example only in which:

FIG. 1 is a schematic view of the optical system of the present invention,

FIG. 2 is a schematic diagram of a selected portion of a photodiode array and,

FIG. 3 is a block diagram of the various components making up the present system.

Referring to FIG. 1, two cameras 1 and 2 are vertically located immediately above a slab 3 emerging from a rolling mill (not shown) out of the plane of the paper, the slab 3 being at a temperature of approximately 1000° C. where it is emitting infra-red radiation. The cameras 1 and 2 have been shown displaced transversely of the slab 3 for clarity. In actual use however the cameras 1 and 2 are in the same vertical plane and are displaced from each other longitudinally in the direction in which the slab 3 is moving. The slab 3 is moving on a conventional roller table 4 towards the next rolling mill stand.

The cameras 1 and 2 incorporates a linear array of infra-red sensitive photo-diodes (not shown) located parallel to the width direction of the slab 3. The cameras 1 and 2 are displaced vertically from each other by a set amount and as previously mentioned are also displaced longitudinally from each other so that the lower camera 2 does not obstruct the field of view of the higher camera 1. The cameras which are manufactured by Reticon Corporation, USA, house 512 diodes in the array. The cameras 1 and 2 are water cooled to protect them from the harsh environment in which they are located.

Each camera 1, 2 is provided with a television camera lens (not shown) so as to form an image of the slab 3 on the respective diode array. The choice of camera lenses naturally depends on a number of factors such as lens magnification and the distance of the lens to the roller table. In a normal case, the roller table width i.e. field of view of each camera is about 2000 mm and the array lengths are 12.7 mm, requiring a magnification of 157.5. For a lower camera 1, in use located 1300 mm from the roller table 4, a lens with a focal length of 8.2 mm is desired. The nearest satisfactory lens is the COSMICAR TELEVISION LENS which has a focal length of 8.5 mm and a maximum aperture stop of f 1.5. This lens gives a lens to image plane distance of 8.56 mm with a total array length translating to a maximum roller table width of 1928.75 mm. For a top camera 2, located 3000 mm from the roller table 2, a desired focal length for the lens is 18.93 mm. The nearest commercial lens available is the VIVITAR TELEVISION LENS which has a focal length of 21 mm and a maximum f stop of 3.8. The lens to image plane length is 21.077 mm and the array length translated onto the roller table is 1808 mm.

The cameras 1 and 2 are focussed onto the roller table 4 so that the images of slab width $Wa_1$ and $Wa_2$ formed on the diodes do, in fact, represent apparent slab widths $Wa_1$ and $Wa_2$ which are dimensionally greater than the actual width $W$ of the slab 1. It will be appreciated of course that this apparent width measurement arises due to the thickness of the slab 1. Where the thickness of the workpiece is negligible, as in the case of a thin strip, the image formed by the cameras will be very close to the actual width of the strip.

We have found that if the apparent widths $Wa_1$ and $Wa_2$, as measured from the images in cameras 1 and 2 are known, and if the distance $L_1$ between the roller table surface 4 and the image in camera 1 and the distance $L_2$ between the roller table surface 4 and the image in camera 2 are known, then the actual width, $W$, of the slab 1 can be determined from the equation:

$$W = \frac{Wa_1 Wa_2(L_2 - L_1)}{Wa_1 L_2 - Wa_2 L_1} \qquad 1$$

This expression is independent of the thickness of the slab. Furthermore, the above expression can be used to measure the width of strip which is being rolled and in the process is flapping—that is, undulating. It is not possible to measure either of these parameters accurately with conventional optical techniques unless the slab thickness is known, and the vertical extent of strip undulation can be accurately estimated. The necessity for this type of knowledge is avoided by the use of our technique.

Additionally, we have also found that knowledge of the parameters shown in equation 1 enables the thickness t of the slab 1 to be calculated from the equation:

$$t = \frac{L_1 L_2 (Wa_1 - Wa_2)}{Wa_1 L_2 - Wa_2 L_1} \quad \quad 2$$

where $Wa_1$, $Wa_2$, $L_1$ and $L_2$ are the expressions previously defined.

The Reticon camera is provided with its own internal video line scan for discharging diodes illuminated by the hot slab passing beneath them. Referring to FIG. 3, the diodes D1 and D2 selected from the 512 diodes effectively behave like integrated capacitors C1 and C2. When diodes D1 and D2 are illuminated, capacitors C1 and C2 are charged and remain charged until transistors T1 and T2 are turned on by a video line scan signal at their base. Directly the transistors T1 and T2 are turned on, the capacitors C1 and C2 discharge through them, connecting up input line L1 to output line L2. The output along line L2 appears as a pulse whose width is proportional to the number of diodes illuminated.

Therefore the pulse width is proportional to the apparent widths $Wa_1$, $Wa_2$ of the imaged slab.

Referring to FIG. 2, the pulses derived from the two cameras 1 and 2 are used to gate a reference oscillator (not shown) into binary counters 5 and 6 which together with the oscillator form part of a microprocessor unit 7.

The reference oscillator synchronously generates the clock frequency of each camera during line scan such that a change in the oscillator frequency produces a corresponding change in the camera clock frequency. For convenience the input to the counters is a binary number corresponding to the measured slab width in millimeters and the reference oscillator and camera clock frequencies are chosen to achieve this result as nearly as possible. As an example with a 512 diode camera and a nominal slab width of 2000 mm, a suitable reference oscillator is a 1 MHz crystal oscillator with the camera clock frequency being ideally 256 KHz. Each camera 1 and 2 generates a data pulse and an enable signal which sets on the first diode that is illuminated and remains on until the end of the complete camera scan. The resetting of the enable signal is used as an end of scan signal. The cameras 1 and 2 operate asynchronously from the microprocessor 7.

The microprocessor 7 itself is the INTEL 8008—1 system which is an 8-bit system with a cycle time of 12.5 S. The microprocessor 7 has four input and four output ports and can be programmed to make the calculations required by equations (1) and (2). Apart from the information regarding $Wa_1$ and $Wa_2$ which is inputted via counters 5 and 6, the microprocessor receives signals from a hot metal detector 8 and "weight input" decade switches 9.

The hot metal detector 8 is the SETPOINT "SPECTRE" system which comprises an array of infra-red sensitive photodiodes located above the slab upstream of the cameras 1, 2 (the slab in FIG. 2 is moving in the direction of the arrow). This detector 8 is activated immediately the diodes sight the leading edge of a hot slab. A signal from the detector 8 is supplied to the microprocessor 7 to initiate the program. After a delay the detector 8 switches off until it is activated by the presence of another slab.

The calculation of the desired crop length to fulfil the necessary weight requirement utilises an average value of $Wa_1$, $Wa_2$ so as to compute an average value of W and t. This average is calculated by the microprocessor from the inputs of $Wa_1$ and $Wa_2$ obtained from a number of camera scans, for instance twenty, over the length of the moving slab. The preferred average is the so-called "running average" $V_{\bar{N}}$ derived from the equation:

$$V_{\bar{N}} = 1/N[(N-1)V_{N-1} + V_N] \quad \quad (3)$$

where N is the number of scan samples, $V_{N-1}$ is the arithmetical average of the last $N-1$ samples and $V_N$ is the value of the Nth scan. The average values of $Wa_1$, and $Wa_2$ are then processed by the microprocessor to obtain the average values of W and t. These are then processed by the microprocessor together with the selected "weight input" value to obtain the desired cropped length, L.

The average values of width, thickness and length are then displayed on a conventional display unit 10 e.g. a TV screen.

While the invention has been described with reference to a hot slab, it will be appreciated that the invention is equally applicable to a cold slab. In this case, light sources are mounted under the roller table to illuminate the edges of the moving slab, the cameras receiving a dark image and the diode system being modified accordingly to take account of this.

It will also be appreciated that while the present invention enables the widths of moving workpieces such as slab, plate, and strip to be measured accurately, so far as thickness measurement is concerned, it is really only applicable to relatively thick workpieces such as slab and bar. Indeed, the applicants have found that the accuracy of thickness measurement is not really acceptable for workpieces in which the thickness dimension is less than one tenth of the width dimension.

We claim:

1. Method for measuring the width and/or the thickness of a workpiece comprising using imaging means to image the total width of a plane of the workpiece at two positions displaced perpendicularly above a datum, and laterally with respect to each other so as to avoid obstruction of one of the images by the other image, producing electrical signals representative of the total widths apparent at these positions by said imaging means, processing the electrical signals to provide signal components having the apparent widths in product and difference terms, and calculating from the components the true workpiece width at the datum and/or the workpiece thickness.

2. A method as claimed in claim 1 in which the actual width W of the workpiece is calculated by processing the signals according to the equation $$W = \frac{Wa_1 Wa_2 (L_2 - L_1)}{Wa_1 L_2 - Wa_2 L_1}$$

where $Wa_1$ is the apparent width of the first image, $Wa_2$ is the apparent width of the second image, $L_1$ is the distance of the first image from the datum and $L_2$ is the distance of the second image from the datum.

3. A method as claimed in claim 1 in which the actual thickness t of the workpiece is calculated by processing the signals according to the formula $$t = \frac{L_1 L_2 (W_{a_1} - W_{a_2})}{W_{a_1} L_2 - W_{a_2} L_1}$$

where the $W_{a_1}$ is the apparent width of the first image, $W_{a_2}$ is the apparent width of the second image, $L_1$ is the distance of the first image from the datum and $L_2$ is the distance of the second image from the datum.

4. A method as claimed in any one of claims 1, 2, or 3 in which the images are reproduced as linear arrays of electrical charges which are scanned for discharge so as to provide the electrical signals, the scanning being continuous to provide several values of $W_{a_1}$ and $W_{a_2}$ along the length of the moving workpiece so that $W_{a_1}$ and $W_{a_2}$ can be averaged to provide an average value of W and/or t.

5. A method as claimed in claim 4 in which the average values of W and t are used to determine a value of length to be cropped from the workpiece to produce a desired cropped weight.

6. A method as claimed in claim 5 in which the electrical signals are pulses of width analogous to that of the apparent image widths.

7. A method as claimed in claim 6 in which the pulses are utilised to generate clock pulses which are counted and utilised to determine the apparent image widths.

8. A method as claimed in claim 7 in which the thickness t of the workpiece is at least one-tenth of the width W to provide an accurate measurement of t.

9. A method as claimed in claim 8 in which the datum is the surface on which the workpiece is supported.

10. Apparatus for measuring the width and/or thickness of a workpiece comprising a pair of imaging devices located at two positions displaced perpendicularly from the workpiece and laterally with respect to each other, said imaging devices being disposed so as to avoid obstruction of one of the images by the other image, the devices being focussable to provide images of a width plan of the workpiece, means for producing electrical signals representative of the image widths apparent at these positions, means for processing said signals to provide signal components having the apparent widths in product and difference terms, and means for determining from the components the actual width and/or the thickness of the workpiece.

11. Apparatus as claimed in claim 10 in which the means for determining the actual width W of the workpiece utilises the equation $$W = \frac{W_{a_1} W_{a_2} (L_2 - L_1)}{W_{a_1} L_2 - W_{a_2} L_1}$$

where $W_{a_1}$ is the apparent width of the first image, $W_{a_2}$ is the apparent width of the second image, $L_1$ is the distance of the first image from the surface upon which the workpiece is supported and $L_2$ is the distance of the second image from the surface upon which the workpiece is supported.

12. Apparatus as claimed in claim 10 in which the means for determining the thickness of the workpiece utilises the equation $$t = \frac{L_1 L_2 (W_{a_1} - W_{a_2})}{W_{a_1} L_2 - W_{a_2} L_1}$$

where $W_{a_1}$ is the apparent width of the first image, $W_{a_2}$ is the apparent width of the second image, $L_1$ is the distance of the first image from the surface upon which the workpiece is supported and $L_2$ is the distance of the second image from the surface upon which the workpiece is supported.

13. Apparatus as claimed in claim 11 in which the imaging devices comprise optical devices such as lenses.

14. Apparatus as claimed in any of claims 11, 12 or 13, in which the means for producing electrical signals comprises radiation sensitive sensors adapted to reproduce the images as linear arrays of electrical charges.

15. Apparatus as claimed in claim 14 in which the sensors are in the form of photodiodes responsive to both infra-red radiation as well as visible light.

16. Apparatus as claimed in claim 15 in which the means for producing electrical signals further includes a scanning means to discharge the photo diodes to produce pulses of widths representative of the apparent widths $W_{a_1}$ and $W_{a_2}$.

17. Apparatus as claimed in claim 16 in which the scanning means are adapted to scan the images continuously to produce several values of $W_{a_1}$ and $W_{a_2}$ along the length of the workpiece whereby $W_{a_1}$ and $W_{a_2}$ can be averaged to provide an average value of W and/or t.

18. Apparatus as claimed in claim 17 in which the means for determining the actual width and/or thickness of the workpiece is adapted to calculate the average values of W and t and thence to determine a value of the length to be cropped from the workpiece to produce a desired crop weight.

19. Apparatus as claimed in claim 18 in which said processing means includes signal translation means comprising an oscillator responsive to the electrical signals to generate pulses numerically analogous to the respective apparent widths, together with a counter for counting the pulses.

20. Apparatus as claimed in claim 19 in which the signal translation means and the means for determining the actual width and/or thickness are a single unit comprising means to process the electrical signal to achieve translation thereof and enable determination to be made from such translated signal of the actual width and/or thickness of the workpiece.

21. Apparatus as claimed in claim 20 in which the unit is a microprocessor.

22. Apparatus as claimed in claim 12 in which the imaging devices comprise optical devices such as lenses.

* * * * *